United States Patent
Holmberg et al.

(10) Patent No.: US 8,032,881 B2
(45) Date of Patent: Oct. 4, 2011

(54) METHOD AND SYSTEM FOR UPGRADING A PLURALITY OF DEVICES

(75) Inventors: Jonas Holmberg, Trelleborg (SE); Joacim Tullberg, Lund (SE); Johan Adolfsson, Sodra Sandby (SE); Martin Gren, Malmo (SE); Kristina Sten, Lund (SE)

(73) Assignee: Axis AB, Lund (SE)

( * ) Notice: Subject to any disclaimer, the term of this patent is extended or adjusted under 35 U.S.C. 154(b) by 1241 days.

(21) Appl. No.: 11/712,062

(22) Filed: Feb. 28, 2007

(65) Prior Publication Data

US 2007/0250830 A1 Oct. 25, 2007

Related U.S. Application Data

(60) Provisional application No. 60/778,621, filed on Mar. 1, 2006.

(51) Int. Cl.
G06F 9/44 (2006.01)
G06F 9/445 (2006.01)

(52) U.S. Cl. .......................... 717/171; 717/177; 717/178

(58) Field of Classification Search ........................ None
See application file for complete search history.

(56) References Cited

U.S. PATENT DOCUMENTS

| | | | |
|---|---|---|---|
| 6,832,373 B2 * | 12/2004 | O'Neill | 717/171 |
| 7,562,360 B2 * | 7/2009 | Tai et al. | 717/178 |
| 7,644,405 B2 * | 1/2010 | Rao et al. | 717/171 |
| 2003/0018759 A1 | 1/2003 | Baumann | |
| 2004/0040023 A1 * | 2/2004 | Ellis et al. | 717/178 |
| 2004/0205779 A1 | 10/2004 | Almeida et al. | |
| 2005/0010913 A1 | 1/2005 | Chen | |
| 2005/0044548 A1 | 2/2005 | Page | |
| 2005/0071385 A1 * | 3/2005 | Rao | 707/200 |
| 2005/0229173 A1 * | 10/2005 | Mihm et al. | 717/171 |
| 2006/0048144 A1 * | 3/2006 | Willess et al. | 717/177 |
| 2007/0067419 A1 * | 3/2007 | Bennett | 709/219 |
| 2007/0089109 A1 * | 4/2007 | Fontijn | 717/177 |

FOREIGN PATENT DOCUMENTS

| | | |
|---|---|---|
| CN | 1588312 | 3/2005 |
| EP | 1 288 779 | 3/2003 |
| EP | 1288779 A | 3/2003 |

OTHER PUBLICATIONS

"Remote Operating System Installation Overview", Internet Citation [Online] Jun. 10, 2001 XP002258896 Retrieved from Internet URL: http://web.archive.org/web/20010610610205/446//http://www.microsoft.com/windows2000/techinfo/howitworks/management/remoteover.asp p. 3 Section "Technology Overview" paragraph 2,paragraph 3.

Remote Operating System Installation Overview, Internet Citation [Online] Jun. 10, 2001 XP002258896 Retrieved from Internet URL: http://web.archive.org/web/2001061060205/446/http://www.microsoft.com/windows2000/techinfo/howitworks/management/remoteover.asp p. 3 Section "Technology Overview" paragraph 2, paragraph 3.

* cited by examiner

*Primary Examiner* — Thuy Dao (74) *Attorney, Agent, or Firm* — Volpe and Koenig, P.C.

(57) ABSTRACT

The invention relates to an electronic device and a method for updating firmware in a number of electronic devices connected to a data network. First, a firmware in a first electronic device of said plurality of electronic devices is configured. Then, a firmware update file is generated in said first electronic device, based upon said configured firmware by using a firmware update file generator. Next, the firmware update file is transmitted from the first electronic device to a number of electronic devices via a data network. Finally, the firmware is updated in the number of electronic devices by executing said firmware update file in each of the electronic devices.

27 Claims, 8 Drawing Sheets

PROCESS FOR CREATING
FIRMWARE

METHOD AND SYSTEM FOR UPGRADING A PLURALITY OF DEVICES

CROSS REFERENCE TO RELATED APPLICATION

This application claims the benefit of prior filed co-pending Provisional Application No. 60/778,621 filed on Mar. 1, 2006 entitled "Method and System for Upgrading a Plurality of Devices" which is incorporated herein by reference in its entirety as if fully set forth herein.

BACKGROUND OF THE INVENTION

1. Field of Invention

The present invention generally relates to a method for updating firmware in a plurality of electronic devices, an electronic device, a user interface apparatus, a system comprising electronic devices and a user interface apparatus, and a computer program product.

2. Description of the Related Art

Many electronic products of today are possible to customize, i.e. the electronic products are possible to configure according to the needs of the specific customer. However, customizing electronic products may be difficult, especially for a user not familiar with the technology involved.

However, if a plurality of electronic products is connected to each other via a network, new problems arise. For instance, if the software of some of the electronic products are to be updated, a proper process for such updating must be available. Such a process may comprise a step of manually update the electronic products.

If a great number of electronic products is to be updated, a large amount of time will be needed to manually update the electronic products, which of course is a drawback. Another drawback is the risk of errors, or in other words mistakes made by the user.

Moreover, in many cases the customization is requested or desired by a company not being the manufacturer of the product. Such a company may for instance be a company providing services for the electronic products in question, a company that uses such electronic products, etc. Those companies will hereinafter be referred to as customizing companies.

Today much of the customization of electronic products may be achieved by changing the firmware of the electronic product. However, in order to get such a customized firmware the customizing companies either have to make the manufacturer prepare and program a customized firmware or make the manufacturer provide information and means for preparing and programming the customised firmware. To prepare and program a customized firmware, or any firmware, generally requires a lot of work and good knowledge of both the software and hardware system of the electronic product to customize.

Hence, there is a need for a solution that makes it easy to update a large number of electronic products. A further need is to reduce the risk of mistakes made in association to the updating.

SUMMARY OF THE INVENTION

In view of the above, an objective of the invention is to solve or at least reduce the problems discussed above. In particular, an objective is to provide an efficient, secure and user friendly way to customize a number of electronic devices connected to a data network.

The wording of firmware is to be interpreted openly as software instructions and parameter values.

The above object is provided according to a first aspect of the invention by a method for updating firmware in a number of a plurality of electronic devices connected to a data network, said method comprising configuring a firmware in a first electronic device of said plurality of electronic devices in accordance to customizing company generated customization data into a customizing company generated firmware, generating a customizing company generated firmware update file based upon said configured firmware in said first electronic device by using a firmware update file generator in said first electronic device, transmitting said customizing company generated firmware update file from said first electronic device to a number of said plurality of electronic devices via a data network, and updating firmware in said number of said plurality of electronic devices by executing said customizing company generated firmware update file in each of said number of said plurality of electronic devices.

One advantage of the present invention is that the customisation of an electronic device is facilitated.

Another advantage is that preparation and programming of customised firmware for an existing electronic device is facilitated and may easily be performed by a person or organisation not having especially detailed knowledge of the product.

Additionally, the customising company do not have to have detailed knowledge of the software and hardware system of the electronic product. This also means that the customising company easily may perform the customization by themselves.

Optionally, the step of configuring said firmware in said first electronic device of said plurality of electronic devices is achieved by transmitting customizing company generated customization data from a user interface apparatus via said data network to said first electronic device.

Optionally, the method may further comprise transmitting said firmware update file generator from a user interface apparatus to said first electronic device.

An advantage of this is that it is not possible to generate the customizing company generated firmware update file unless the firmware update file generator is transmitted to the electronic device. This implies increased system security.

Optionally, the step of transmitting said customizing company generated firmware update file from said first electronic device to said number of said plurality of electronic devices comprises the sub-steps of transmitting said customizing company generated firmware update file from said first electronic device to a user interface apparatus, and transmitting said customizing company generated firmware update file from said user interface apparatus to said number of said plurality of electronic devices.

An advantage of this is that the customizing company generated firmware update file is first transmitted to the user interface apparatus before being transmitted to the number of electronic devices. In this way, an operator of the user interface apparatus may confirm the transmission to the number of electronic devices, which means increased system security.

Optionally, the method may further comprise transmitting a feedback signal from said first electronic device to said user interface apparatus upon said step of configuring said firmware in said first electronic device of said plurality of electronic devices.

Moreover, feedback may also be transmitted from the first electronic device to the user interface apparatus during the generation of the customizating company generated firmware update file.

Optionally, each of said number of said plurality of electronic devices may comprise a memory with a non-alterable partition and an alterable partition, and said method may further comprise marking data sections in said alterable partition containing device specific information for each of said number of said plurality of electronic devices, and wherein said step of updating said number of said plurality of electronic devices by executing said customizing company generated firmware update file in each of said number of said plurality of electronic devices may further comprise replacing said marked data sections in said alterable partition with device specific information from said non-alterable partition.

Optionally, the method may further comprise configuring said customizing company generated firmware in one of said number of plurality of electronic devices in accordance to user generated customization data, wherein said step of configuring said customizing company generated firmware further comprises storing said customizing company generated firmware in a memory in said one of said number of said plurality of electronic devices as customizing company generated default firmware, and replacing said customizing company generated firmware in said one of said number of plurality of electronic devices by a user generated firmware in accordance to said user customization data.

Optionally, the method may further comprise transmitting a customizing company generated default firmware request to said one of said number of said plurality of electronic devices, and replacing said user generated firmware in said one of said number of said plurality of electronic devices by said stored customizing company generated default firmware.

An advantage of this is that it is possible to reset the electronic device to customizing company generated firmware, i.e. customizing company default settings.

Optionally, the method may further comprise transmitting a producing company generated default firmware request from said user interface apparatus to said number of said plurality of electronic devices via said data network, downloading a producing company generated default firmware update file from an external server to said number of said plurality of electronic devices via said data network, and replacing said updated firmware by using said producing company default firmware update file in said number of said plurality of electronic devices.

The above object is provided according to a second aspect of the invention by an electronic device comprising a network interface adapted to enable reception and transmission of data via a data network, a memory adapted to store data, a processor, in association with said memory, configured to provide a firmware configurator adapted to configure a firmware in said memory into a customizing company generated firmware by using customizing company generated customization data, a firmware update file generator receiver adapted to receive a firmware update file generator via said data network, said firmware update file generator being adapted to generate a customizing company generated firmware update file based upon said configured firmware in said electronic device, and a customizing company generated firmware update file transmitter adapted to enable transmission of said customizing company generated firmware update file via said data network to a number of a plurality of electronic devices, wherein said customizing company generated firmware update file is adapted to update said firmware in said number of said plurality of electronic devices upon execution in said number of said plurality of electronic devices.

The advantages of the first aspect are also applicable for the second aspect.

Optionally, the firmware update file generator receiver may be configured to enable reception of said firmware update file generator from a user interface apparatus via said data network.

Optionally, the customizing company generated firmware update file transmitter is configured to enable transmission of said firmware update file to a user interface apparatus via said data network.

Optionally, the electronic device further comprises a feedback signal transmitter adapted to transmit a feedback signal from said electronic device to said user interface apparatus, wherein said feedback signal comprises information describing said updated firmware.

Optionally, the memory may be divided into a non-alterable partition comprising a loader software and device specific information, and an alterable partition comprising marked data sections containing device specific information, wherein said marked data sections are replaced by a said device specific information upon execution of said customizing company generated firmware update file.

Optionally, the alterable partition may be divided into a read-only partition comprising a customizing company generated default firmware, and a readable and writeable partition comprising data and applications used in said electronic device, wherein said readable and writeable partition is replaced by said customizing company generated default firmware upon reception of a customizing generated default firmware request.

Optionally, the firmware updating handler is further configured to store said customizing company generated firmware as a customizing company generated default firmware before replacing said customizing company generated firmware with said updated firmware.

Optionally, the electronic device may further comprise a producing company generated default firmware receiver adapted to receive a producing company generated default firmware from an external server, and a producing company generated default firmware handler adapted to replace said updated firmware with said received producing company generated default firmware upon reception of a producing company generated default firmware request.

Optionally, the electronic device may be a network camera.

The above object is provided according to a third aspect of the invention by a user interface apparatus comprising a network interface adapted to enable reception and transmission of data via an associated data network, a user input device, a memory adapted to store data, a processor configured to, in association with said memory, provide a customization data generator adapted to generate customizing company generated customization data based upon data received via said user input device, and a customizing company generated customization data transmission handler configured to transmit said generated customization data to a first electronic device via said data network.

The advantages of the first aspect are also applicable for the third aspect.

Optionally, the processor, in association with said memory, may further be configured to provide a firmware update file receiver configured to receive a customizing company generated firmware update file from said first electronic device, and a firmware update file distributor configured to transmit said received customizing company generated firmware update file to a number of a plurality of electronic devices via said data network.

Optionally, the user input device may further be configured to transmit a producing company generated default firmware request from said user interface apparatus to an external server via said data network, wherein said firmware update file receiver is further configured to receive a producing company generated default firmware update file from said external server, and wherein said firmware update file distributor may further be configured to transmit said received producing company generated default firmware update file to a number of a plurality of electronic devices via said data network.

Optionally, the user interface apparatus may further comprise a feedback signal receiver adapted to receive a feedback signal from said first electronic device via said data network, and a user output device adapted to show said feedback signal.

The above object is provided according to a fourth aspect of the invention by a system comprising a data network, a user interface apparatus as described above associated to said data network, at least one electronic device as described above associated to said data network, a plurality of electronic devices, wherein each of said plurality of electronic devices is configured to receive a firmware update file via said data network, and to update a firmware by executing said received firmware update file.

The advantages of the first aspect of the invention are also applicable for the fourth aspect of the invention.

Optionally, each of said electronic devices may be configured as described above.

Optionally, the updated firmware file may be transmitted from said at least one electronic device of said plurality of electronic devices to similar electronic devices among said plurality of electronic devices.

Optionally, the system may further comprise an external server adapted to hold a producing company default firmware update file, and configured to, upon request from said user interface apparatus, transmit said producing company default firmware update file to said user interface apparatus.

The above object is provided according to a fifth aspect of the invention by a computer program comprising software instructions arranged to perform the method as described above.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one in-stance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF THE EMBODIMENTS

Figure 1:
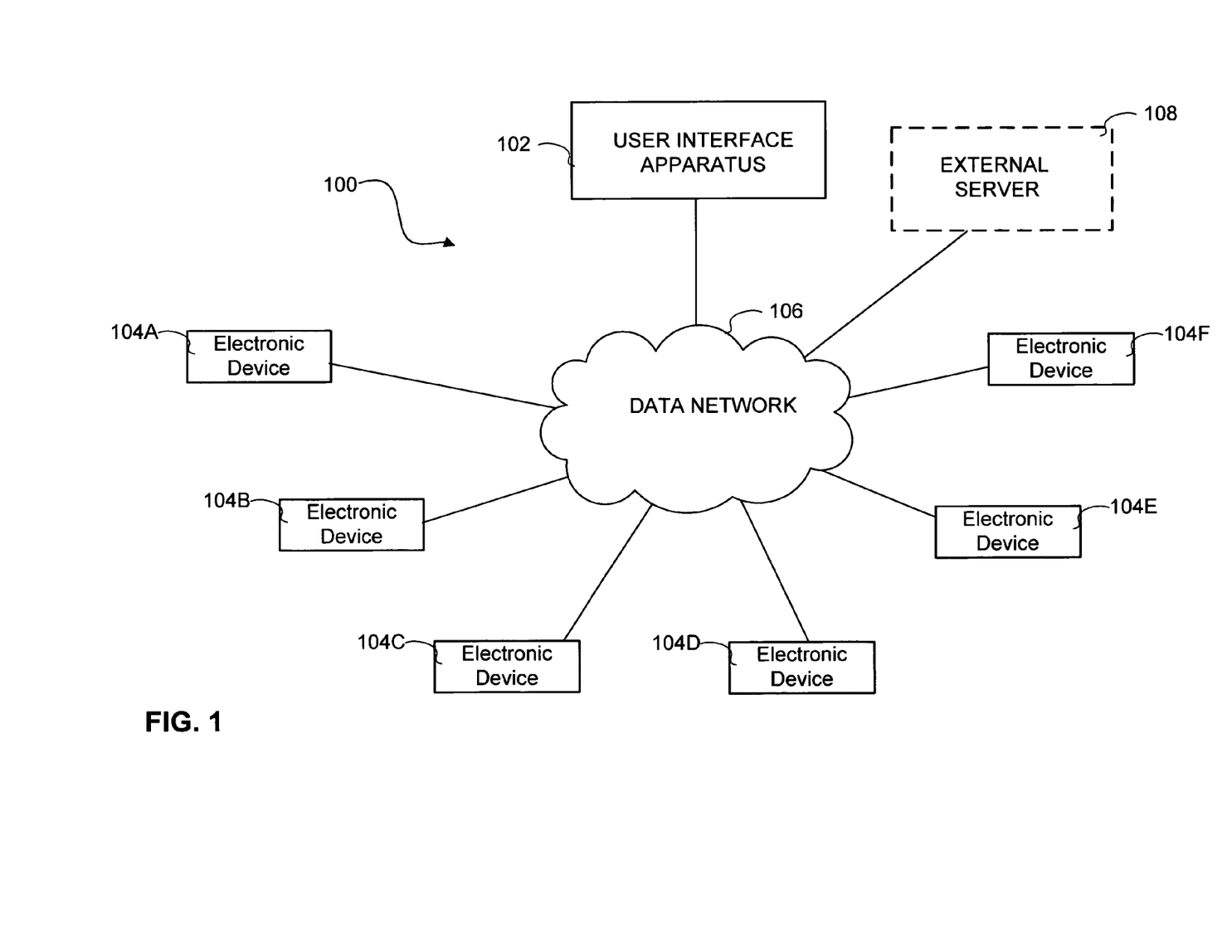
FIG. 1 is a diagrammatic illustration of a system comprising a number of electronic devices, a user interface apparatus, an external server and a data network connecting the user interface apparatus to the electronic devices.

FIG. 1 generally illustrates a system 100 comprising a user interface apparatus 102 and a plurality of electronic devices 104A-104F connected to each other via a data network 106. Further, the data network 106 may be an IP based data network.

The user input apparatus 102 may be a client computer or other apparatus comprising a user interface, i.e a user input device, such as buttons, and optionally a user output device, such as a display. The electronic device 104 may be a device comprising a processor and a memory, wherein the control, or part of the control, of the device is enabled by software instructions stored and processed in the device itself. Such software instructions may be referred to as firmware.

Optionally, an external server 108 may be associated to the data network 106. The external server may comprise data that may be downloaded by the user interface apparatus 102 or the electronic devices 104A-104F.

Figure 2:
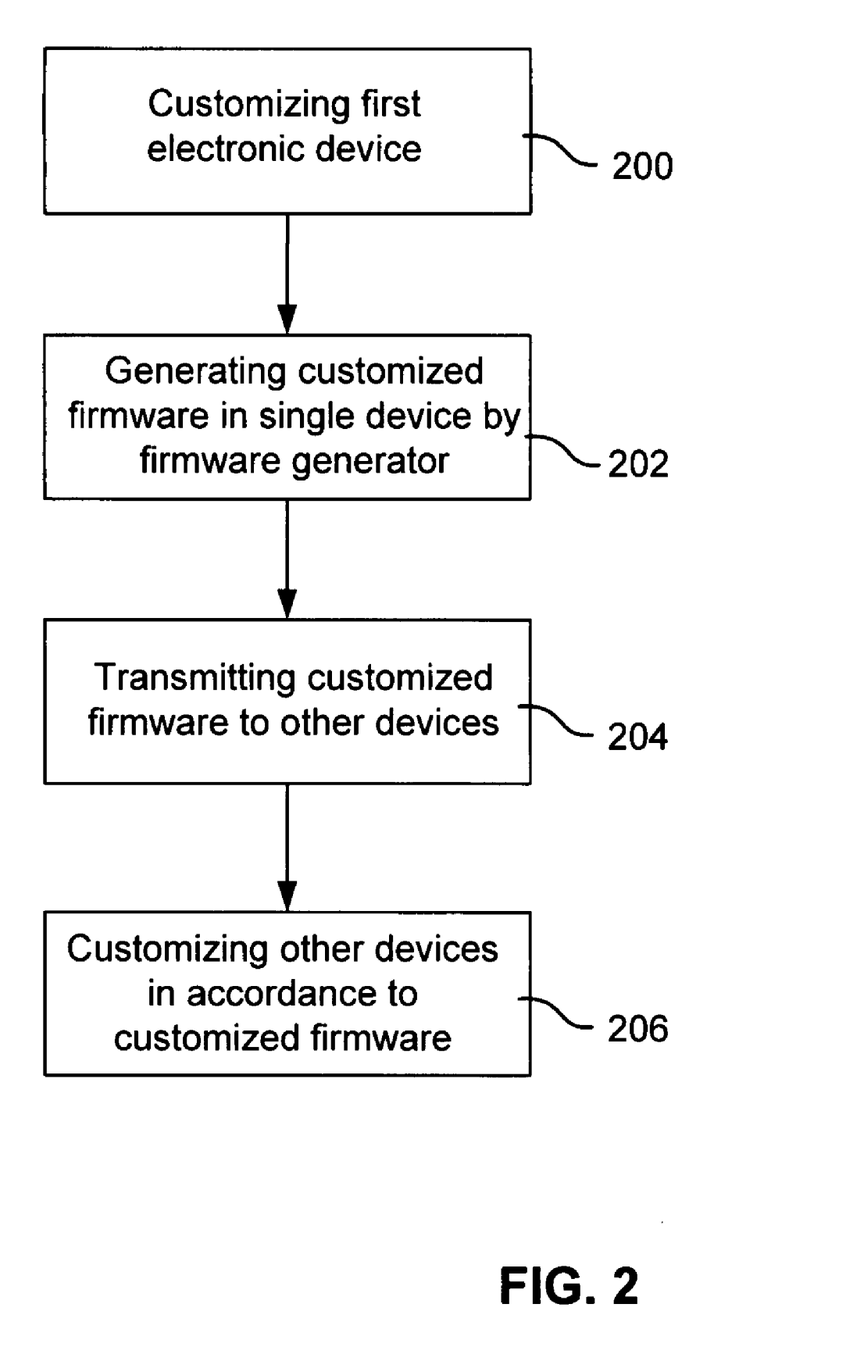
FIG. 2 is a general method for updating firmware in a plurality of electronic devices.

In FIG. 2, a general embodiment of a method for updating the firmware of the electronic devices is illustrated.

Firstly, step 200, a first electronic device 104A of said plurality of electronic devices 104A-104F is customized. Such customization may include customer specific functions, customer specific parameters, customer specific reference data etc. This type of customer specific data may hereinafter be referred to as customization data.

Secondly, step 202, when the first electronic device has been customized, a firmware update file generator is downloaded and executed in said single electronic device 104A in order to generate a firmware update file. Thirdly, step 204, the generated firmware update file is transmitted to all, or a number of, the other electronic devices 104B-104F of the system 100.

Optionally, the devices to which the firmware update file is transmitted may be the devices that are similar to the first electronic device and that are connected to the data network.

Fourthly, step 206, each of the other electronic devices 104B-104F are customized in accordance to the received generated customized firmware update file.

In other words, only one of the electronic devices 104A-104F, in this example the single electronic device 104A, is customized in a first place. This means that the user can try a number of combinations on this single electronic device 104A, and, when an appropriate customization is achieved, forwarding this appropriate customization to the other electronic devices 104B-104F.

Optionally, the firmware generator may be comprised within the single electronic device 104A as default, i.e. the firmware generator does not have to be downloaded.

Figure 3:
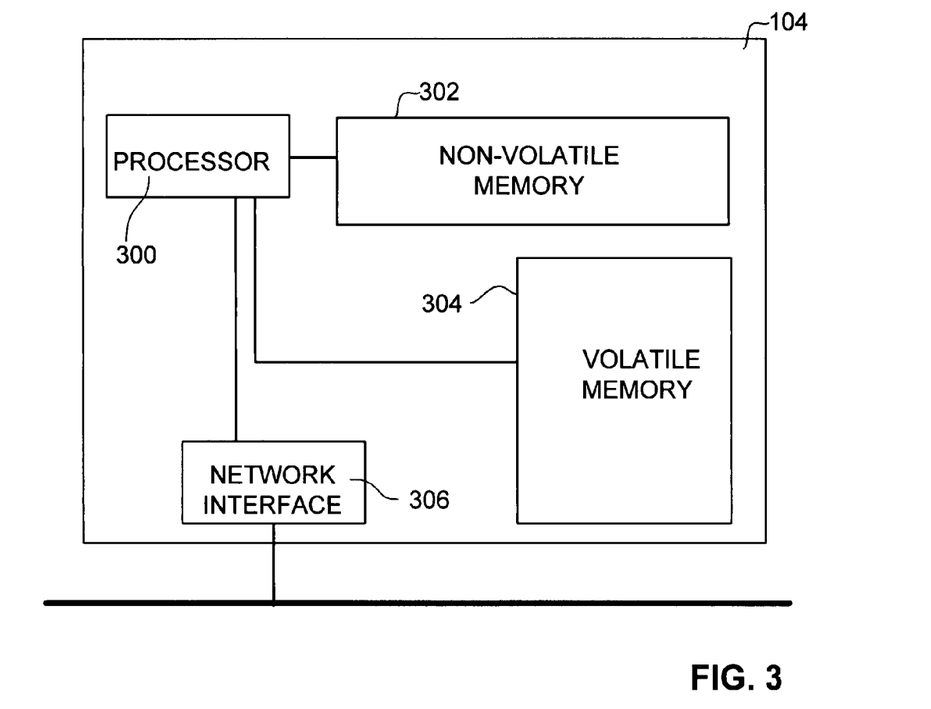
FIG. 3 is a diagrammatic illustration of an electronic device.

In FIG. 3, an embodiment of the electronic device 104 is diagrammatically illustrated. In this embodiment the electronic device 104 comprises a processor 300, a non-volatile memory 302, such as a Flash memory, a volatile memory 304, such as a RAM, and a network interface 306 configured to connect the electronic device 104 to the data network 106.

The customization data, i.e. software instructions, parameters, reference data etc., may be stored in the non-volatile memory 302. Hence, when customizing the electronic device in accordance to prior described step 200, the customization data stored in the non-volatile memory is changed.

When downloading and executing the firmware generator to the single electronic device 104A in accordance to step 202, the firmware generator may be downloaded and executed in the volatile memory 304.

Figure 4:
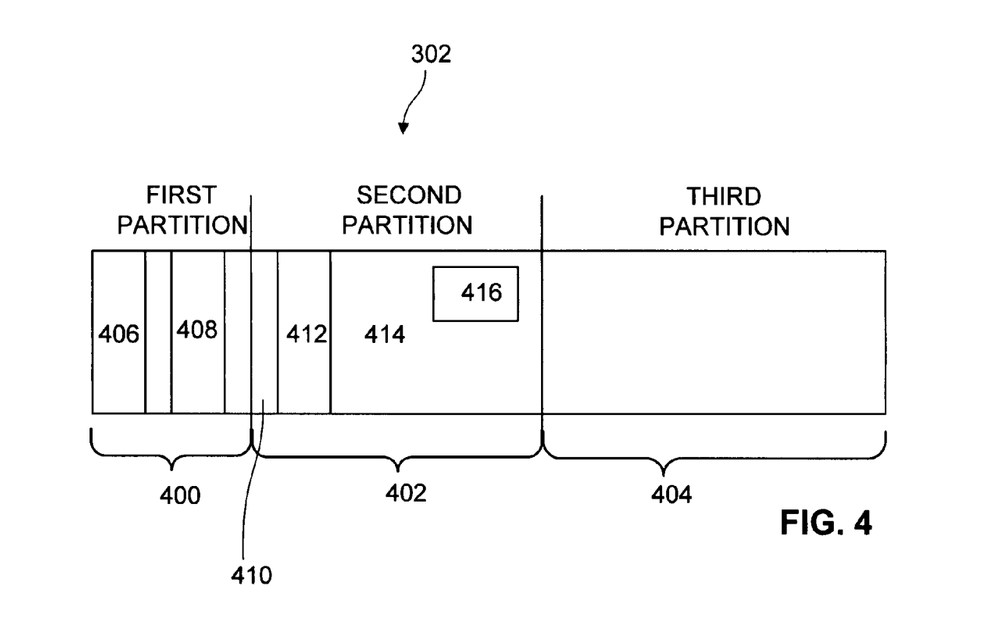
FIG. 4 is a diagrammatic illustration of a non-volatile memory comprised in the electronic device illustrated in FIG. 3.

In FIG. 4, one embodiment of the non-volatile memory 302 is illustrated. In this embodiment, the non-volatile memory is divided into at least three partitions, referred to as first partition 400, second partition 402 and third partition 404.

Generally, the first partition 400 may be a non-alterable partition, which means that neither the firmware update file nor the user when customizing the electronic device 104, are able to change the data stored in the first partition 400.

In one embodiment, such a first non-alterable partition 400 may include a basic flash loader software 406 and device unique data and parameters 408. This partition is not rewritten after the device has left the factory. The basic flash loader 406 may be a Resident Flash Loader RFL enabling loading of data into the flash memory, e.g. via a network using http or other protocols, when some error in other partitions are indicated. Such an error may for instance be indicated when a checksum for the second and/or third partition do not match during the start of the system. The device unique data and parameters may for instance be one of or a combination of device ID, serial number, keys for decryption and/or encryption, etc.

Generally, the second partition 402 may comprise data that may be altered by the firmware update file, but not by the user when customizing the electronic device 104.

In one embodiment, the second partition of the flash memory is a CRAMFS (Compressed ROM File System), which is a read only partition. This second partition may include a partition table 410, a decompressor 412 arranged to at least unpack the kernel, a compressed operating system kernel 414, and resetting data 416 enabling resetting to "factory default" of the electronic device. The operating system kernel may, for example, be a Linux kernel, a Unix kernel, etc. The resetting data 416 may include a set of files, data and/or programs which are a copy of the set of files, data and/or programs that resides in a third partition when the system are shipped from the factory, i.e. "factory default". When the electronic device is reset to factory default said resetting data 416 is copied into the third partition 404.

Generally, the third partition 404 is a partition that may be altered by the firmware update file and the customization data.

In one embodiment, the third partition may be a readable and writeable partition having a JFFS (Journaling Flash File System), e.g. a JFFS1 or JFFS2. However, the third partition may be provided with any type of readable and writeable file system. This partition includes data, applications and other programs used in the electronic device.

To sum up, the firmware update file may include data for setting up the second and third partitions and all the data that are to be included in those partitions.

Figure 5:
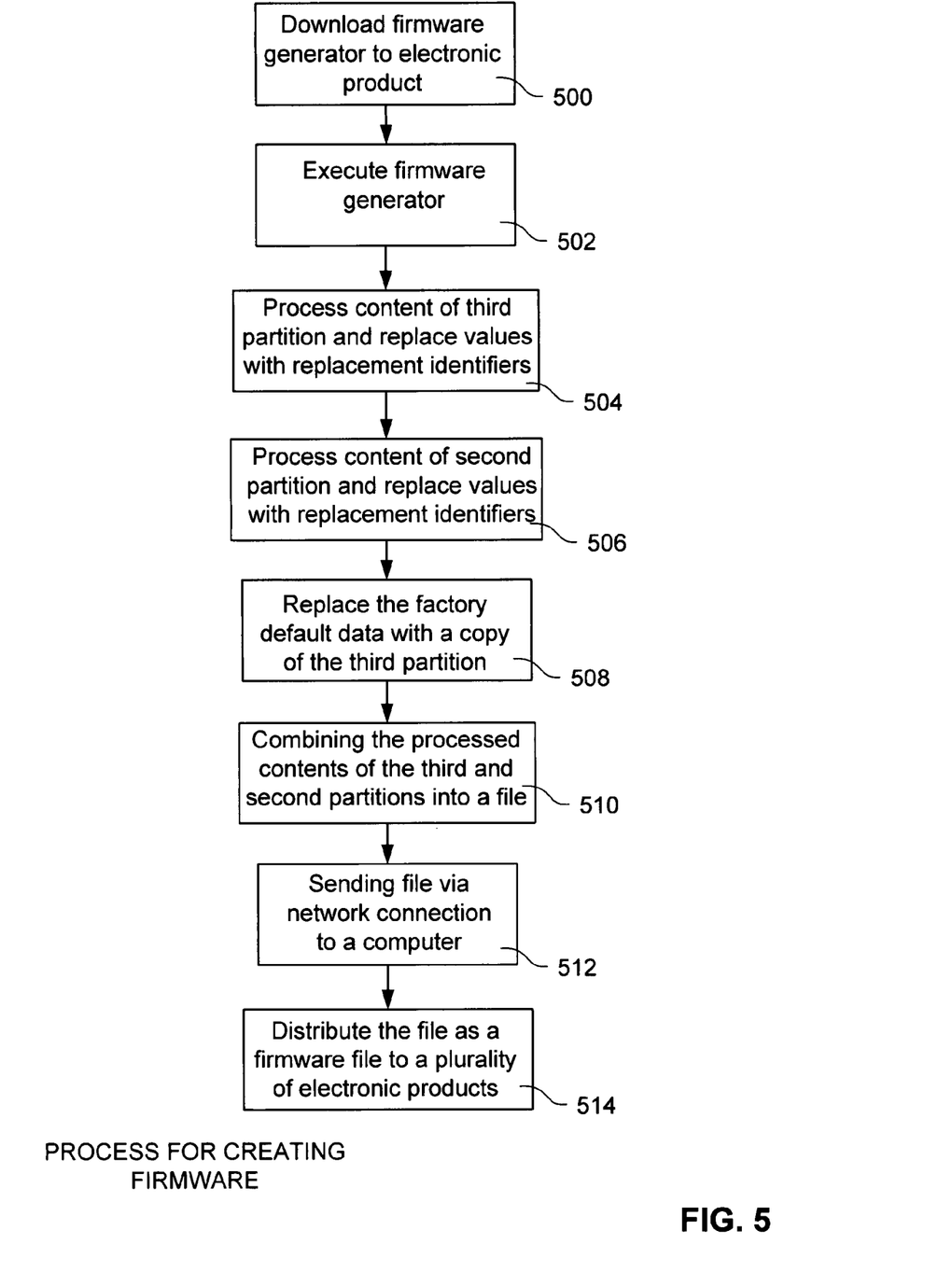
FIG. 5 is a flow chart of an embodiment of a method according to the present invention.

In a method according to the invention a new firmware for an electronic device is achieved by means of the following process, see FIG. 5.

Downloading a firmware generator into the electronic device 500. When downloaded the firmware generator is executed in the device 502. The firmware generator may be downloaded to and executed from the RAM.

During execution the firmware generator process the content of the third partition and replaces some particular values in the data of the third partition with replacement indicators 504. The values replaced with replacement indicators are values that are unique for each individual device and which, thus, have to be replaced with the values of the device into which the firmware are loaded during a firmware upgrade procedure. Some examples of such values may be the MAC address of the device, a serial number, a host name, some device identifier 508.

When the content of the third partition has been processed the second partition is processed in a similar way, i.e. specific values are exchanged for replacement indicators. Additionally, the factory default data included in the second partition is replaced by a copy of the third partition.

Then the processed contents of the second and third partition is combined to a single file 510 and sent to a client 512 for distribution as a new firmware 514. The client to which the new firmware is sent may be a computer used to initiate the creation of the firmware or a predetermined address arranged to receive and manage such customised new firmware.

By generating a firmware using the above method it is easy to customise electronic devices by simply preparing a single device, i.e. downloading custom software, parameters and data into the non-volatile memory of the electronic device. In an embodiment like the one described above such custom software, parameters and data is downloaded into the third partition during the customisation of the single device. Then when the single device has been customized the firmware generator is downloaded and executed in said single device in order to generate a customized new firmware which may be used to update and, thus, customize other similar devices by simply installing the customized new firmware to those other similar devices.

In some electronic devices the memory space of the non-volatile memory is restricted and the firmware generator may therefore not reside in the non-volatile memory. In order to execute the firmware generator file in the electronic device the electronic device may be accessed from a computer via a computer network, e.g. a LAN, a WAN, the Internet or any other network, and then a firmware generator file accessible from said computer may be downloaded to the electronic device. The firmware generator file is provided with an identity that makes it possible for the electronic device to recognise the file as a firmware generator file. When the firmware generator file has been downloaded to the electronic device the electronic device recognise the file as a firmware generator file and executes it in volatile memory. When executed the firmware generator file performs the method described above.

As described above the execution of the firmware generator processes the third partition and the second partition and it replaces some data of the third partition and some data of the second partition with other data than the data present during the copying.

In some systems the processing may include copying these partitions to the volatile memory and then replacing, in the copies, the data to be replaced with replacement indicators. In such a system the copied and adjusted data from the partitions may be combined in the volatile memory of the electronic device to a new firmware file.

However, in some systems there are not enough volatile memory to perform the processing entirely in the volatile memory. For such cases the firmware generator may use a method in which the data of the partitions is not copied to the volatile memory for further adjustments. One such method includes the following steps:

Identifying the data of the third partition that are to be replaced with replacement identifiers. When the data is identified the data is temporarily copied to volatile memory and the path and folder, for instance the folder "x" in the path "a/b/c/x/", in the file system where the identified data is found is identified. Then, the firmware generator mounts a file system on the folder in the path. If a Linux or Unix operating system is running this new file system takes the place of the "x" folder of the non-volatile memory and results in that data written to the folder "x" is stored in another memory, e.g. the volatile memory. The data residing at the addresses of the third partition previously accessed in the folder "x" is still present in the third partition, however not accessible via that path. Then the previously copied data from the folder is copied into the folder having a new file system and then the data to be replaced is replaced by a replacement identifier or identifiers. All folders including data identified for replacement is managed in this way. When the processing of the third partition is finished then the second partition is processed in a similar way. In the second partition the factory default data and the path to the folder in the file system including this data is identified, a new file system is mounted on this folder and the data of the third partition is stored in this new file system. Then the firmware file may be uploaded by defining the paths to upload as a firmware file. This process will then upload the folders residing in the non-volatile memory, which are the original position of these folders. However when uploading the folders on which new file systems has been mounted the data is retrieved from the addresses of the newly mounted folder instead of the addresses of the original folder.

This method results in additional advantages to the advantage of occupying a small amount of temporary memory space. One such additional advantage is that if the electronic device stops operating or malfunction for other reasons during the process, the original file systems of the device is used upon restart of the electronic device. Thus, because no changes have been made to the data at the addresses of the original file system the replacements will not be effective and the device may be run as if no malfunction or changes of the data ever occurred.

The firmware generator may be a program or a script. In one embodiment the firmware generator is a CGI script. The firmware generator may be downloaded to the electronic device by an administrator accessing an HTML page (Hyper Text Markup Language) residing on the electronic device. The HTML page allow the administrator to select a file from any site accessible by the administrator and initiate the download. The HTML page may be arranged to be accessible only by administers being able to authenticate themselves as administers.

Accordingly, there is described a method for updating a plurality of electronic devices or devices including updating a single electronic device, generating an update file by means of a process performed by the single electronic device, sending the update file from the single electronic to a storage medium external to the single electronic device, sending the update file to a plurality of electronic devices similar to the single electronic device.

Additionally there is described a method for generating an update file or new firmware file including executing a firmware generator in a single electronic device, generating a new firmware file by reading data from a non-volatile memory of the electronic device, replacing device unique data with replacement indicators, replacing data stored for enabling resetting of the electronic device to factory default with data making up the present configuration of the electronic device and arranging the resulting data in a firmware file.

According to one embodiment of the invention the firmware of an Axis Network Camera or Video Server can be customized in terms of added, removed and modified files and default values of parameters. This document describes how to create modified versions of original Axis firmware. The custom firmware can be used to upgrade several cameras or video servers of the same model and when set to factory default, devices will all contain the same configuration, scripts, custom web pages, custom applications, etc. as the camera or video server that was used for creating the new firmware.

A specific embodiment of the method according to the invention is described below.

Introduction

Devices using firmware version 4.20 or later have support for running scripts and applications uploaded via HTTP. This functionality is called kickstart and consists of an HTML page and a CGI script. From the HTML page the user selects the UNIX tar file to upload. The CGI script receives the file, extracts the files from the archive to a temporary directory within the device and executes the extracted kickstart file if it exists. When the execution of kickstart is finished, the uploaded file and all files extracted from it will be removed.

Uploading a custom firmware kickstart file using the kickstart HTML page initiates the construction of a firmware image file. The firmware is generated from the live file systems of the network camera or video server that kickstart executes on. The factory default settings of the generated firmware will be the same as the current settings of the device when initiating the construction of the new firmware. The web browser uploading the kickstart file will receive progress information while the device builds the new firmware. When the new firmware is ready, it will be sent to the web browser as an octet-stream and the user will be prompted to save the firmware as a binary file.

The device that generates the new firmware will not be affected by the operation. However, the returned firmware can be used for upgrading that device and all devices of the same model, using the normal firmware upgrade procedure.

Theory

The generated firmware is almost an exact replica of the firmware currently running in the product that generates it. However, some things must not be an exact copy of what the product contains, e.g. the MAC address.

The following properties will be changed automatically when generating the new firmware:

The variable RELEASE in /usr/share/axis-release/variables (parameter Properties.Firmware.Version) will be modified to indicate that the new firmware is not the same as the original firmware.

The string "-custom#" is appended to the value of RELEASE, where # is a sequence number, which is increased upon each new firmware generated. Thus it is important that a firmware generated for the purpose of being an upgrade of an earlier generated firmware is done by the earlier generated firmware. Otherwise both firmwares will have the same version number.

The variable JIMAGEID in /usr/etc/defaultfiles/jimageid and the variable JFFSID in /etc/release are modified.

Axis video products have two file systems. One read-only file system, containing files that cannot be modified by the user, and one writable file system containing files that may be added, removed or modified by the user (e.g. files containing parameter values). When upgrading a product, the value of JIMAGEID in the read-only file system of the new firmware is compared to the value of JFFSID in the writable file system of the old firmware. The writable file system will be upgraded only if the values differ. Both variables must be modified when generating new firmware in order to make an upgrade to the generated firmware work as intended.

The new value of RELEASE is used as the value of both JIMAGEID and JFFSID. Therefore it is important that firmware generated for the purpose of being an upgrade of an earlier custom firmware version is done by the previous custom firmware version. Otherwise both firmware versions will have the same value of JIMAGEID and JFFSID and upgrading from one to the other will not work as intended.

The factory default image (/usr/etc/defaultfiles/jimage) will be regenerated to match the writable file system of the new firmware.

The variable HOSTNAME in the file /etc/confd/hostname (parameter Network.Hostname) will be reset to the default value. The variable MAC in the file /etc/conf.d/mac will be reset to the default value.

The variable UPNP_FRIENDLYNAME in the file /etc/conf.d/upnp (parameter Network.UPnP.FriendlyName) will be reset to the default value.

The variable RENDEZVOUS_FRIENDLYNAME in the file /etc/conf.d/rendezvous (parameter Network.Bonjour.FriendlyName) will be reset to the default value.

All occurrences of AudioAddress and VideoAddress in the file /etc/sysconfig/rtp.conf (parameters Network.RTP.R#.AudioAddress and Network.RTP.R#.VideoAddress) will be reset to the default values.

Generating the Firmware
Follow these steps to generate a new firmware version.
Configure the Product
Change parameter settings, upload files to the writable file system etc. until everything is in the desired state for being the factory default state of the new firmware.
Enable Kickstart
The kickstart functionality is disabled by default and must be enabled after power up and after each upload of a kickstart file.
To enable the kickstart CGI, a file called /var/lib/kickstart must be created in the file system of the product and must contain the character 1 only. Use the built-in editor, editcgi, to create this file:
Open an existing file in editcgi, e.g. using the location http://myserver/admin-bin/editcgi.cgi?file=/var/lib/resolv.conf in a web browser.
Change the Save as input field to: /var/lib/kickstart
Change the file contents input area to: 1
Note
The input area must only contain one character and no whitespace characters. Use the arrow keys on your keyboard to make sure that there are no spaces or newlines before or after the 1.
Press the Save file button.
Make sure that the reply in the web browser indicates that only one byte of data was saved.
When a kickstart file is uploaded or the product is rebooted, the file will be removed. The file will not be present in the generated firmware.
Upload the Kickstart File
Before initiating the construction of a new firmware version, make sure the product is in the desired default state.

Figure 6A:
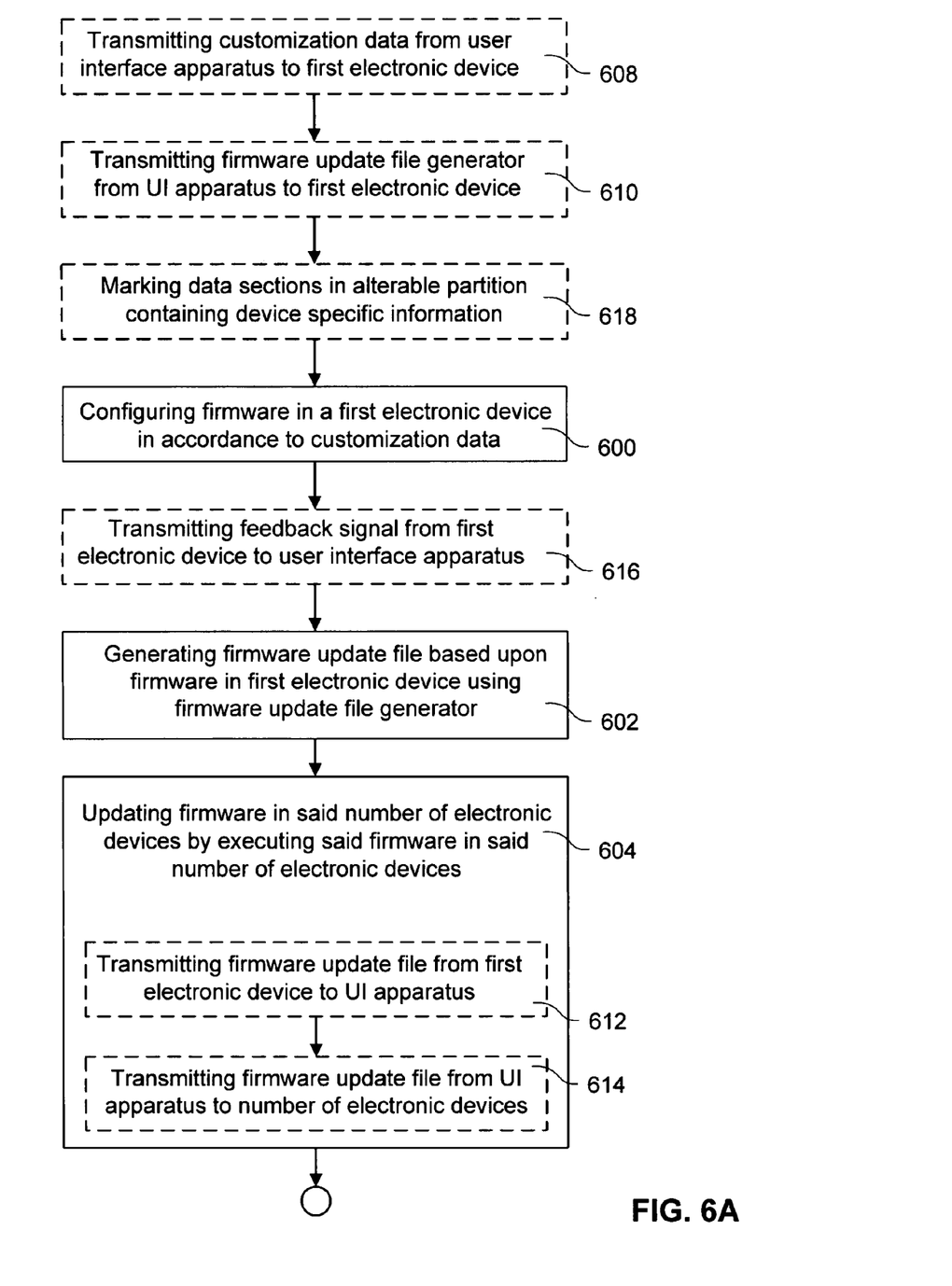
FIGS. 6A and 6B are a flow chart of another embodiment of a method according to the present invention.
Figure 6B:
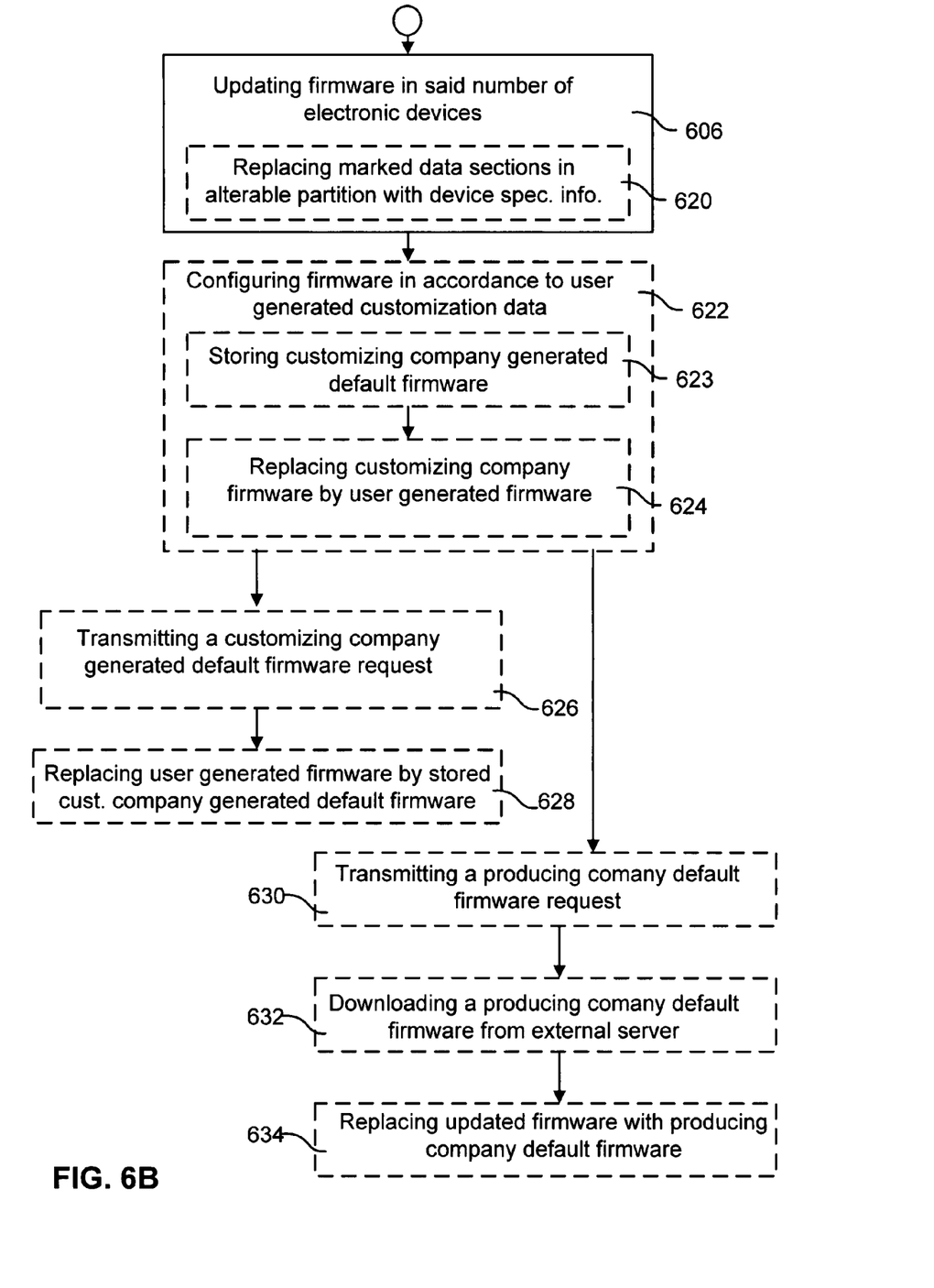

Open http://myserver/admin/kickstart.html in a compliant web browser.
Use the Browse button in the HTML page to locate the custom firmware kickstart file.
Press the Start button. Progress information should be presented in your web browser as the new firmware is generated. The process takes several minutes so have patience and let the web browser wait for a reply. When the firmware has been generated it will be sent directly to the web browser as an application/octet-stream attachment.
Save the generated firmware on your computer.
Note
When creating a new version of the generated custom firmware version, the new version must be generated from the previously generated custom firmware version. Otherwise the normal upgrade procedure will upgrade the read-only file system only, and leave the old writable file system intact until the product is reset to factory default.
Using the Generated Firmware
Use the generated firmware by upgrading any product of the same model as the product that generated the firmware, using normal firmware upgrade procedure. Consult the product manual for more information.
Note that normal firmware upgrade will preserve the values of parameters and the contents of some files. To set the upgraded product to the default state of the new custom firmware, reset the product to factory default.
Tip
By using the button Restore or the HTTP API http://myserver/axiscgi/admin/factorydefault.cgi the product will keep its IP address.
The video product can at any time be restored to Axis' original factory default by upgrading the product with the latest firmware available at http://www.axis.com/and then setting it to factory default.
Hence, Custom Firmware is a way of generating new device firmware, with custom factory default settings, using the device itself.
A file containing certain tools is uploaded via HTTP and received by a CGI-script in the device. The CGI-script extracts the tools from the file and starts executing a script that generates a new firmware, where the current settings of the device is used as factory default settings.
The benefits of this is that Custom Firmware makes it possible to create a new firmware, similar to an existing firmware release, for a device without building it from scratch, i.e. without using any other hardware than the device itself.
In FIG. 6, an embodiment of a method, according to the present invention, for updating firmware in a number of a plurality of electronic devices connected to a data network is illustrated. The method comprises
configuring a firmware in a first electronic device of said plurality of electronic devices in accordance to customizing company generated customization data into a customization company generated firmware 600,
generating a customizing company generated firmware update file based upon said configured firmware in said first electronic device by using a firmware update file generator in said first electronic device 602,
transmitting said customizing company generated firmware update file from said first electronic device to a number of said plurality of electronic devices via a data network 604, and
updating firmware in said number of said plurality of electronic devices by executing said customizing company generated firmware update file in each of said number of said plurality of electronic devices 606.

Optionally, the step of configuring said firmware in said first electronic device of said plurality of electronic devices may be achieved by transmitting customizing company generated customization data from a user interface apparatus via said data network to said first electronic device 608.

Optionally, the method may further comprise transmitting said firmware update file generator from a user interface apparatus to said first electronic device 610.

Optionally, the step of transmitting said firmware update file from said first electronic device to said number of said plurality of electronic devices may comprise the sub-steps of transmitting said customizing company generated firmware update file from said first electronic device to said user interface apparatus 612, and transmitting said customizing company generated firmware update file from said user interface apparatus to said number of said plurality of electronic devices 614.

Optionally, the method may further comprise transmitting a feedback signal from said first electronic device to said user interface apparatus upon said step of configuring said firmware in said first electronic device of said plurality of electronic devices 616.

Optionally, each of said number of said plurality of electronic devices may comprise a memory with a non-alterable partition and an alterable partition, and said method may further comprise marking data sections in said alterable partition containing device specific information for each of said number of said plurality of electronic devices 618, and the step of updating said number of said plurality of electronic devices by executing said customizing company generated firmware update file in each of said number of said plurality of electronic devices may further comprise replacing said marked data sections in said alterable partition with device specific information from said non-alterable partition 620.

Optionally, the method may further comprise configuring said customizing company generated firmware in one of said number of plurality of electronic devices in accordance to user generated customization data 622, wherein said step of configuring said customizing company generated firmware further comprises storing said customizing company generated firmware in a memory in said one of said number of said plurality of electronic devices as customizing company generated default firmware 623, and replacing said customizing company generated firmware in said one of said number of plurality of electronic devices by a user generated firmware in accordance to said user customization data 624.

Optionally, the method may further comprise transmitting a customizing company generated default firmware request to said one of said number of said plurality of electronic devices 626, and replacing said user generated firmware in said one of said number of said plurality of electronic devices by said stored customizing company generated default firmware 628.

Optionally, the method may further comprise transmitting a producing company generated default firmware request from said user interface apparatus to said number of said plurality of electronic devices via said data network 630, downloading a producing company generated default firmware update file from an external server to said number of said plurality of electronic devices via said data network 632, and replacing said updated firmware by using said producing company generated default firmware update file in said number of said plurality of electronic devices 634.

Figure 7:
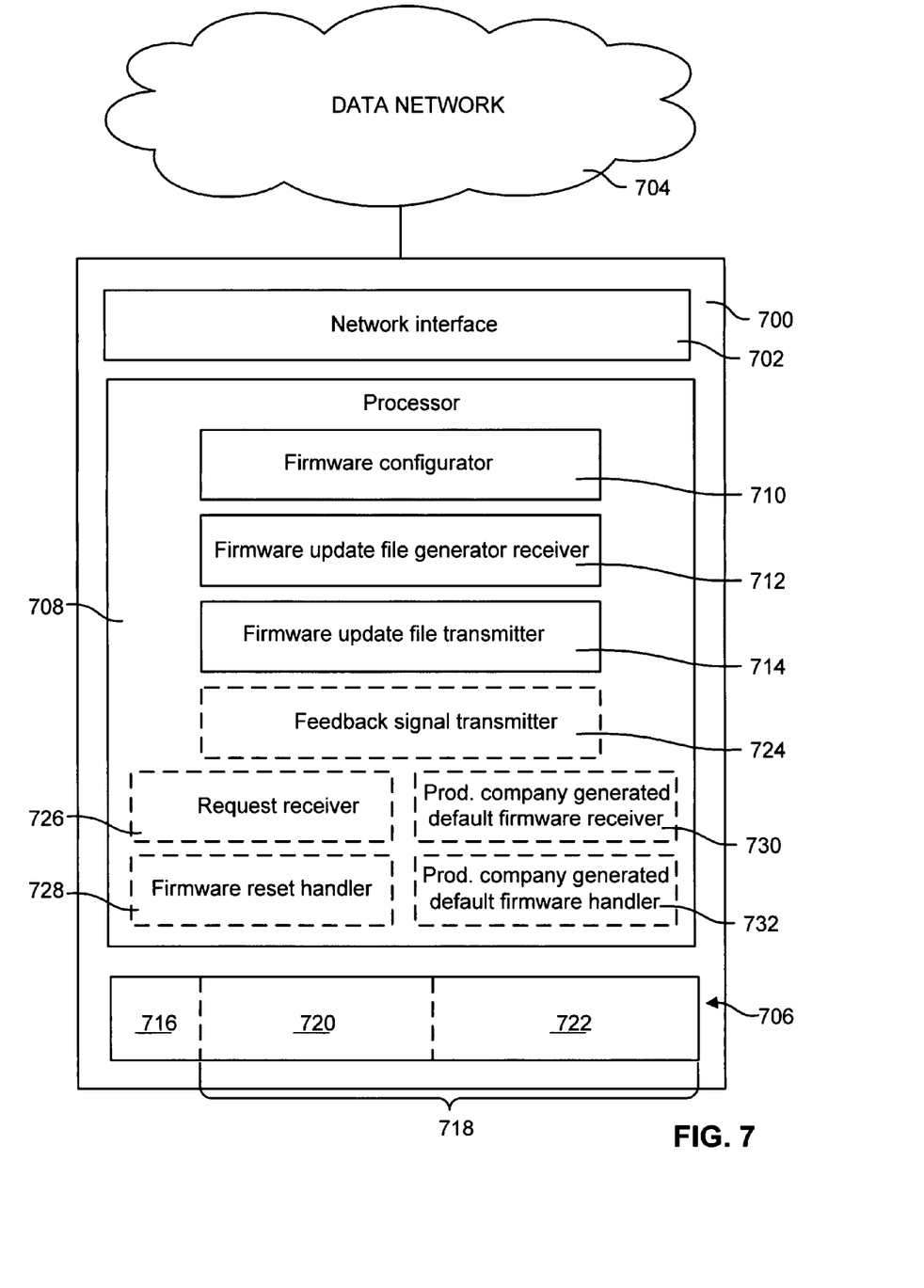
FIG. 7 is a diagrammatic illustration of another embodiment of the electronic device.

In FIG. 7, an electronic device 700 according to the invention is illustrated. The electronic device 700 comprises a network interface 702 adapted to enable reception and transmission of data via a data network 704, a memory 706 adapted to store data, a processor 708, in association with said memory 706, configured to provide a firmware configurator 710 adapted to configure a firmware in said memory into a customising company generated firmware by using customizing company generated customization data, a firmware update file generator receiver 712 adapted to receive a firmware update file generator via said data network, said firmware update file generator being adapted to generate a customizing company generated firmware update file based upon said configured firmware in said electronice device, and a customizing company generated firmware update file transmitter 714 adapted to enable transmission of said customizing company generated firmware update file via said data network, wherein said customizing company generated firmware update file is adapted to update said firmware in said number of said plurality of electronic devices upon execution in said number of said plurality of electronic devices.

Optionally, the firmware update file generator receiver 712 may be configured to enable reception of said firmware update file generator from a user interface apparatus via said data network 704.

Optionally, the customizing company generated firmware update file transmitter 714 may be configured to enable transmission of said firmware update file to a number of said plurality of electronic devices via said data network 704.

Optionally, the customizing company generated firmware update file transmitter 714 may be configured to enable transmission of said firmware update file to a user interface device via said data network 704.

Optionally, the electronic device may further comprise a feedback signal transmitter 724 adapted to transmit a feedback signal from said electronic device to said user interface apparatus, wherein said feedback signal comprises information describing said updated firmware.

Optionally, the memory 706 may be divided into a non-alterable partition 716 comprising a loader software and device specific information, and an alterable partition 718 comprising marked data sections containing device specific information, wherein said marked data sections are replaced by a said device specific information upon execution of said customizing company generated firmware update file.

Optionally, the alterable partition 718 may be divided into a read-only partition 720 comprising a customizing company generated default firmware, and a readable and writeable partition 722 comprising data and applications used in said electronic device 700, wherein said readable and writeable partition is replaced by said customizing company generated default firmware upon reception of a customizing generated default firmware request.

Optionally, the firmware configurator 710 may be configured to store said customizing company generated firmware as resetting data before replacing said customizing company generated firmware with said updated firmware.

Optionally, the electronic device may further comprise a request receiver 726 adapted to receive a customizing company generated firmware default request via said data network, and a firmware reset handler 728 configured to replace said readable and writeable partition by said stored customizing company generated default firmware upon reception of a customizing generated default firmware request.

Optionally, the electronic device may further comprise a producing company generated default firmware receiver 730 adapted to receive a producing company generated default firmware from an external server, and a producing company generated default firmware handler 732 adapted to replace said updated firmware with said received producing company generated default firmware upon reception of a producing company generated default firmware request.

Optionally, the electronic device may be a network camera.

Figure 8:
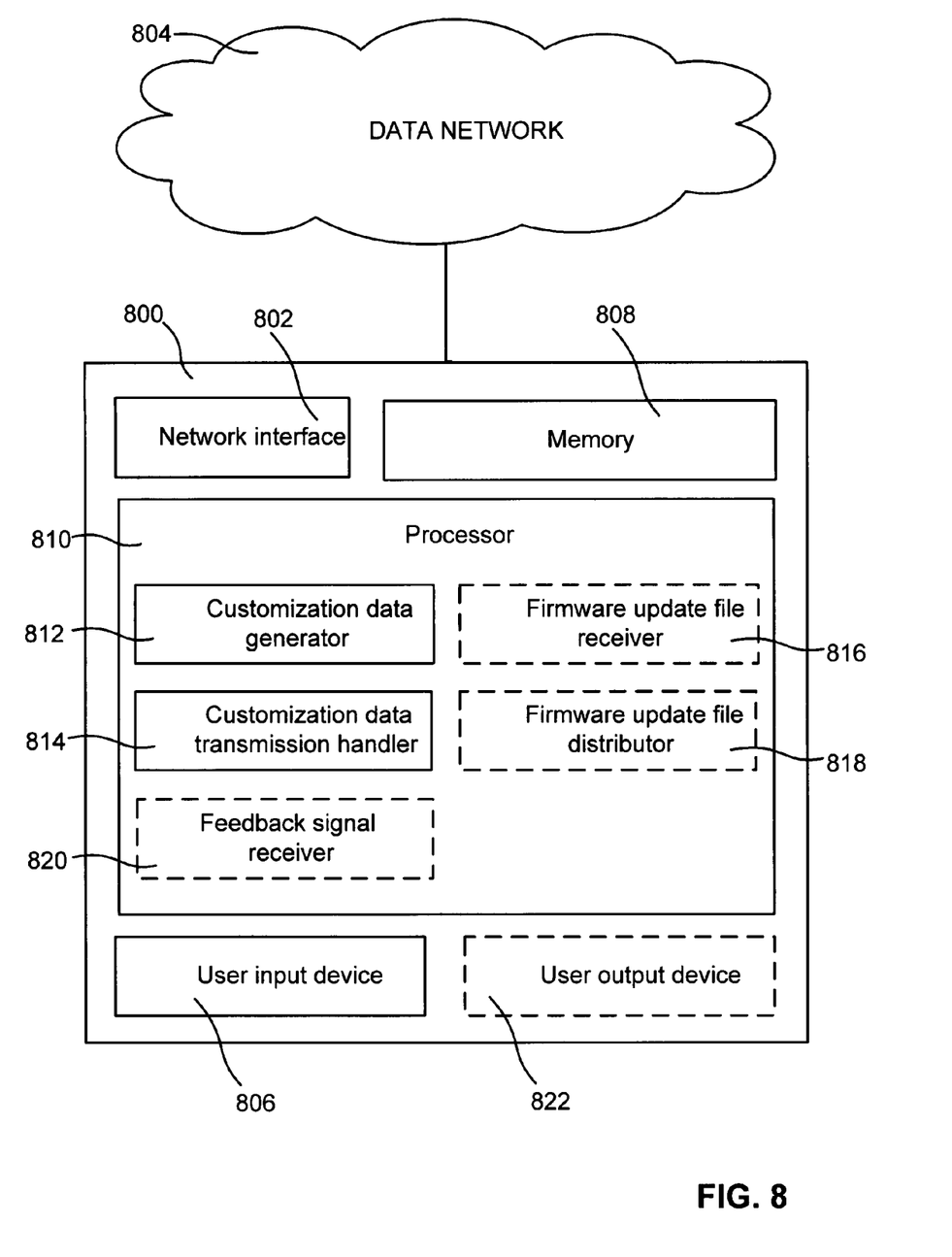
FIG. 8 is a diagrammatic illustration of an embodiment of a user interface apparatus.

In FIG. 8, a user interface apparatus 800 comprising a network interface 802 adapted to enable reception and transmission of data via an associated data network 804, a user input device 806, a memory 808 adapted to store data, a processor 810 configured to, in association with said memory 808, provide a customization data generator 812 adapted to generate customizing company generated customization data based upon data received via said user input device, and a customizing company generated customization data transmission handler 814 configured to transmit said generated customization data to a first electronic device via said data network 804.

Optionally, the processor 810, in association with said memory 808, may further be configured to provide a firmware update file receiver 816 configured to receive a customizing company generated firmware update file from said first electronic device, and a firmware update file distributor 818 configured to transmit said received customizing company generated firmware update file to a number of a plurality of electronic devices via said data network 804.

Optionally, the user input apparatus 806 may further be configured to transmit a producing company generated default firmware request from said user interface apparatus 800 to an external server via said data network 804, wherein said firmware update file receiver 816 may further be configured to receive a producing company generated default firmware update file from said external server, and wherein said firmware update file distributor 818 may further be configured to transmit said received producing company generated default firmware update file to a number of a plurality of electronic devices via said data network 804.

Optionally, the user interface apparatus may further comprise a feedback signal receiver 820 adapted to receive a feedback signal from said first electronic device via said data network, and a user output device 822 adapted to show said feedback signal.

A system according to the present invention is illustrated in FIG. 1. The system 100 comprises a data network 106, a user interface apparatus 102 as described above, associated to the data network 106, at least one electronic device 104A as described above associated to said data network, and a plurality of electronic devices 104B-104F, wherein each of the plurality of electronic devices 104B-104F is configured to receive a firmware update file via said data network, and to update a firmware by executing said received firmware update file.

Optionally, each of the electronic devices may be configured as described above.

Optionally, the updated firmware file may be transmitted from said at least one electronic device of said plurality of electronic devices to similar electronic devices among said plurality of electronic devices.

Optionally, the system 100 may further comprise an external server 108 adapted to hold a producing company generated default firmware update file, and configured to, upon request from said user interface apparatus 102, transmit said producing company generated default firmware update file to said user interface apparatus 102.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A method executed by at least one processing unit, for updating firmware in a number of a plurality of electronic devices connected to a data network, said method comprising
   configuring a firmware in a first electronic device of said plurality of electronic devices in accordance to customizing company generated customization data into a customizing company generated firmware,
   generating a customizing company generated firmware update file based upon said configured firmware in said first electronic device by using a firmware update file generator in said first electronic device, wherein the firmware in the first electronic device includes a first partition that is non-alterable, a second partition that is alterable by the customizing company generated firmware update file, but not by a user of the first electronic device, and a third partition that is alterable by either the customizing company generated firmware update file or the user of the first electronic device
   transmitting said customizing company generated firmware update file from said first electronic device to a number of said plurality of electronic devices via a data network, and
   updating firmware in said number of said plurality of electronic devices by executing said customizing company generated firmware update file in each of said number of said plurality of electronic devices;
wherein the step of updating includes setting resetting data of the firmware of the plurality of electronic devices to the customizing company generated customization data.

2. The method according to claim 1, wherein said step of configuring said firmware in said first electronic device of said plurality of electronic devices is achieved by transmitting customizing company generated customization data from a user interface apparatus via said data network to said first electronic device.

3. The method according to claim 1, further comprising
   transmitting said firmware update file generator from a user interface apparatus to said first electronic device.

4. The method according to claim 1, wherein said step of transmitting said customizing company generated firmware update file from said first electronic device to said number of said plurality of electronic devices comprises the sub-steps of
   transmitting said customizing company generated firmware update file from said first electronic device to a user interface apparatus, and
   transmitting said customizing company generated firmware update file from said user interface apparatus to said number of said plurality of electronic devices.

5. The method according to claim 1, further comprising
   transmitting a feedback signal from said first electronic device to said user interface apparatus upon said step of configuring said firmware in said first electronic device of said plurality of electronic devices.

6. The method according to claim 1, wherein each of said number of said plurality of electronic devices comprises a memory with a non-alterable partition and an alterable partition, and said method further comprises marking data sections in said alterable partition containing device specific information for each of said number of said plurality of electronic devices, and wherein said step of updating said number of said plurality of electronic devices by executing said customizing company generated firmware update file in each of said number of said plurality of electronic devices further comprises replacing said marked data sections in said alterable partition with device specific information from said non-alterable partition.

7. The method according to claim 1, further comprising configuring said customizing company generated firmware in one of said number of plurality of electronic devices in accordance to user generated customization data, wherein said step of configuring said customizing company generated firmware further comprises storing said customizing company generated firmware in a memory in said one of said number of said plurality of electronic devices as customizing company generated default firmware, and replacing said customizing company generated firmware in said one of said number of plurality of electronic devices by a user generated firmware in accordance to said user generated customization data.

8. The method according to claim 7, further comprising transmitting a customizing company generated default firmware request to said one of said number of said plurality of electronic devices, and replacing said user generated firmware in said one of said number of said plurality of electronic devices by said stored customizing company generated default firmware.

9. The method according to claim 1, further comprising transmitting a producing company generated default firmware request from said user interface apparatus to said number of said plurality of electronic devices via said data network, downloading a producing company generated default firmware update file from an external server to said number of said plurality of electronic devices via said data network, and replacing said updated firmware by using said producing company default firmware update file in said number of said plurality of electronic devices.

10. An electronic device comprising
a network interface adapted to enable reception and transmission of data via a data network,
a memory adapted to store data,
a processor, in association with said memory, configured to provide
a firmware configurator adapted to configure a firmware in said memory into a customizing company generated firmware by using customizing company generated customization data,
a firmware update file generator receiver adapted to receive a firmware update file generator via said data network, said firmware update file generator being adapted to generate a customizing company generated firmware update file based upon said configured firmware in said electronic device, wherein the firmware includes a first partition that is non-alterable, a second partition that is alterable by the customizing company generated firmware update file, but not by a user of the electronic device, and a third partition that is alterable by either the customizing company generated firmware update file or the user of the electronic device, and a customizing company generated firmware update file transmitter adapted to enable transmission of said customizing company generated firmware update file via said data network to a number of a plurality of electronic devices, wherein said customizing company generated firmware update file is adapted to update said firmware in said number of said plurality of electronic devices upon execution in said number of said plurality of electronic devices, and wherein said customizing company generated firmware update file is adapted to set resetting data of the firmware of the plurality of the electronic devices to the customizing company generated customization data.

11. The electronic device according to claim 10, wherein said firmware update file generator receiver is configured to enable reception of said firmware update file generator from a user interface apparatus via said data network.

12. The electronic device according to claim 10, wherein said customizing company generated firmware update file transmitter is configured to enable transmission of said firmware update file to a user interface apparatus via said data network.

13. The electronic device according to claim 10, further comprising
a feedback signal transmitter adapted to transmit a feedback signal from said electronic device to said user interface apparatus, wherein said feedback signal comprises information describing said updated firmware.

14. The electronic device according to claim 10, wherein said memory is divided into
a non-alterable partition comprising a loader software and device specific information, and
an alterable partition comprising marked data sections containing device specific information, wherein said marked data sections are replaced by a said device specific information upon execution of said customizing company generated firmware update file.

15. The electronic device according to claim 14, wherein said alterable partition is divided into
a read-only partition comprising a customizing company generated default firmware, and
a readable and writeable partition comprising data and applications used in said electronic device,
wherein said readable and writeable partition is replaced by said customizing company generated default firmware upon reception of a customizing generated default firmware request.

16. The electronic device according to claim 14, wherein said firmware configurator is further configured to store said customizing company generated firmware as a customizing company generated default firmware before replacing said customizing company generated firmware with said updated firmware.

17. The electronic device according to claim 10, further comprising
a producing company generated default firmware receiver adapted to receive a producing company generated default firmware from an external server, and
a producing company generated default firmware handler adapted to replace said updated firmware with said received producing company generated default firmware upon reception of a producing company generated default firmware request.

18. The electronic device according to claim 10, wherein said electronic device is a network camera.

19. A user interface apparatus comprising
a network interface adapted to enable reception and transmission of data via an associated data network,
a user input device,
a memory adapted to store data,
a processor configured to, in association with said memory, provide
a customization data generator adapted to generate customizing company generated customization data based upon data received via said user input device, wherein the data in the user interface apparatus includes a first partition that is non-alterable, a second partition that is alterable by the customizing company generated customization data, but not by a user of the user interface apparatus, and a third partition that is alterable by either the customizing company generated customization data or the user of the user interface apparatus and
a customizing company generated customization data transmission handler configured to transmit said generated customization data to a first electronic device via said data network, wherein said customizing company generated customization data is adapted to set resetting data of the first electronic device to the customizing company generated customization data.

20. The user interface apparatus according to claim 19, wherein said processor, in association with said memory, is further configured to provide
a firmware update file receiver configured to receive a customizing company generated firmware update file from said first electronic device, and
a firmware update file distributor configured to transmit said received customizing company generated firmware update file to a number of a plurality of electronic devices via said data network.

21. The user interface apparatus according to claim 20,
wherein said user input device is further configured to transmit a producing company generated default firmware request from said user interface apparatus to an external server via said data network,
wherein said firmware update file receiver is further configured to receive a producing company generated default firmware update file from said external server, and
wherein said firmware update file distributor is further configured to transmit said received producing company generated default firmware update file to a number of a plurality of electronic devices via said data network.

22. The user interface apparatus according to claim 19, further comprising
a feedback signal receiver adapted to receive a feedback signal from said first electronic device via said data network, and
a user output device adapted to show said feedback signal.

23. A system comprising
a data network,
a user interface apparatus according to claim 19 associated to said data network,
at least one electronic device according to claim 1 associated to said data network, and
a plurality of electronic devices, wherein each of said plurality of electronic devices is configured to receive a firmware update file via said data network, and to update a firmware by executing said received firmware update file, wherein said update includes setting resetting data of the firmware of the plurality of electronic devices to customizing company generated customization data.

24. The system according to claim 23, wherein each of said electronic devices is configured according to claim 1.

25. The system according to claim 23, wherein said updated firmware file is transmitted from said at least one electronic device of said plurality of electronic devices to similar electronic devices among said plurality of electronic devices.

26. The system according to claim 23, further comprising
an external server adapted to hold a producing company default firmware update file, and configured to, upon request from said user interface apparatus, transmit said producing company default firmware update file to said user interface apparatus.

27. A non-transitory computer-readable medium comprising software instructions arranged to perform the method according to claim 1.

* * * * *

UNITED STATES PATENT AND TRADEMARK OFFICE
CERTIFICATE OF CORRECTION

| | | |
|---|---|---|
| PATENT NO. | : 8,032,881 B2 | Page 1 of 1 |
| APPLICATION NO. | : 11/712062 | |
| DATED | : October 4, 2011 | |
| INVENTOR(S) | : Holmberg et al. | |

It is certified that error appears in the above-identified patent and that said Letters Patent is hereby corrected as shown below:

IN THE CLAIMS

In claim 23, at column 20, line 15, after the word "claim", delete "1" and insert therefor --10--.

In claim 24, at column 20, line 25, after the word "claim", delete "1" and insert therefor --10--.

Signed and Sealed this
Twenty-seventh Day of March, 2012

David J. Kappos
*Director of the United States Patent and Trademark Office*